Sept. 26, 1967  JAMES E. WEBB  3,344,425
ADMINISTRATOR OF THE NATIONAL AERONAUTICS
AND SPACE ADMINISTRATION
MONOPULSE TRACKING SYSTEM
Filed June 13, 1966  6 Sheets-Sheet 1
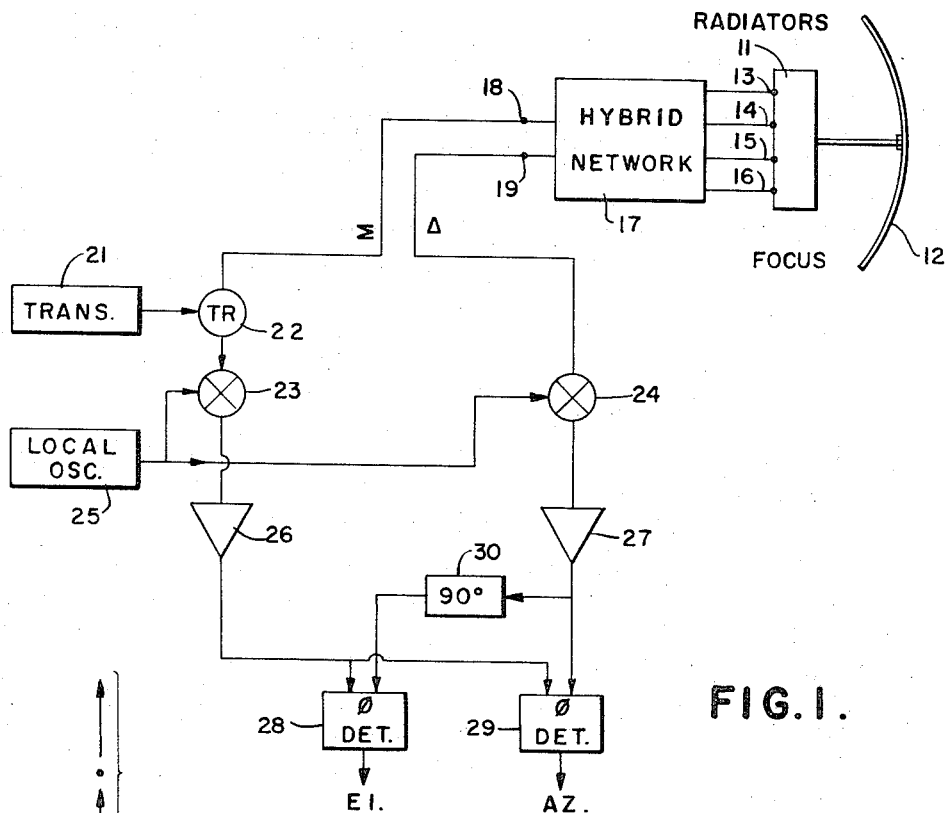
FIG. 1.
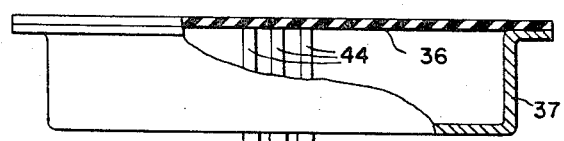
FIG. 3.
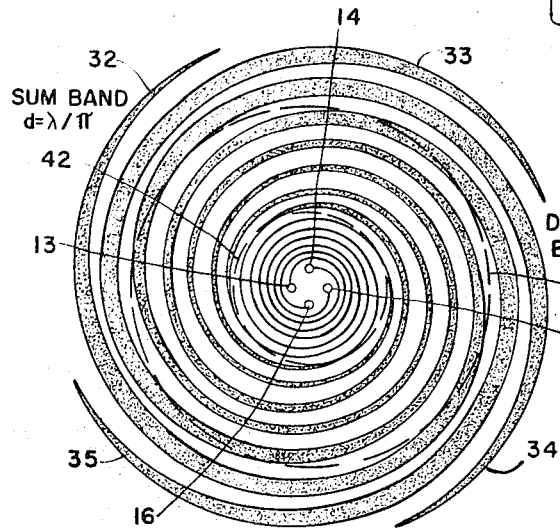
FIG. 5.
FIG. 2.
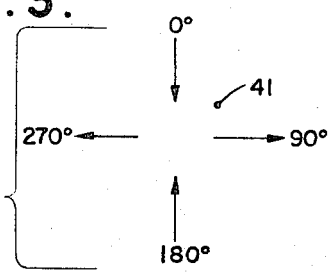
FIG. 4.
INVENTOR
John Paul Shelton, Jr.
BY
ATTORNEYS

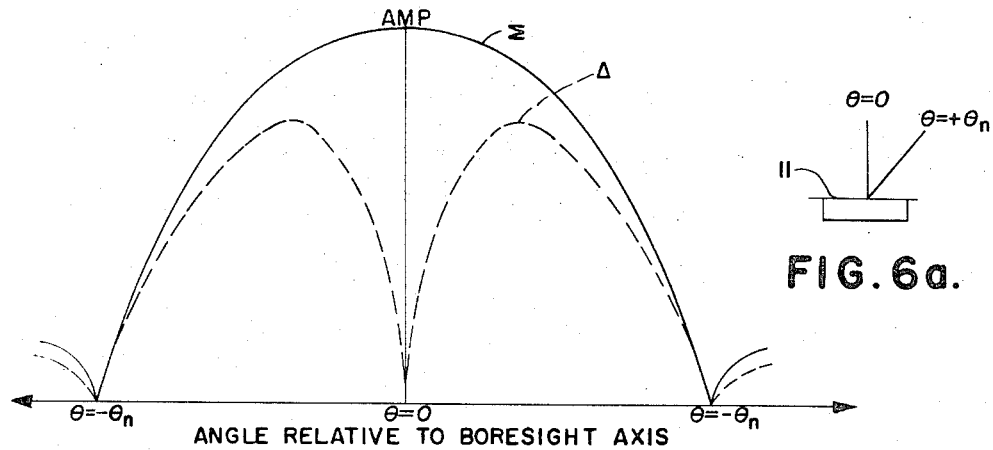
FIG. 6.
FIG. 6a.
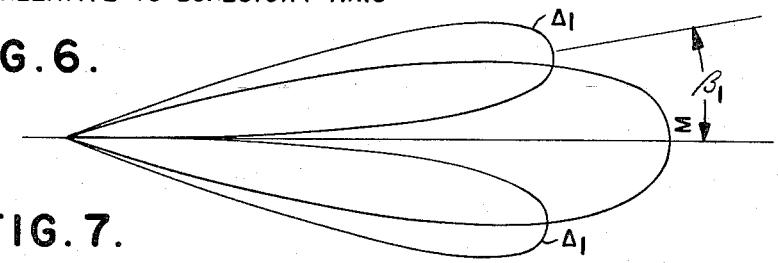
FIG. 7.
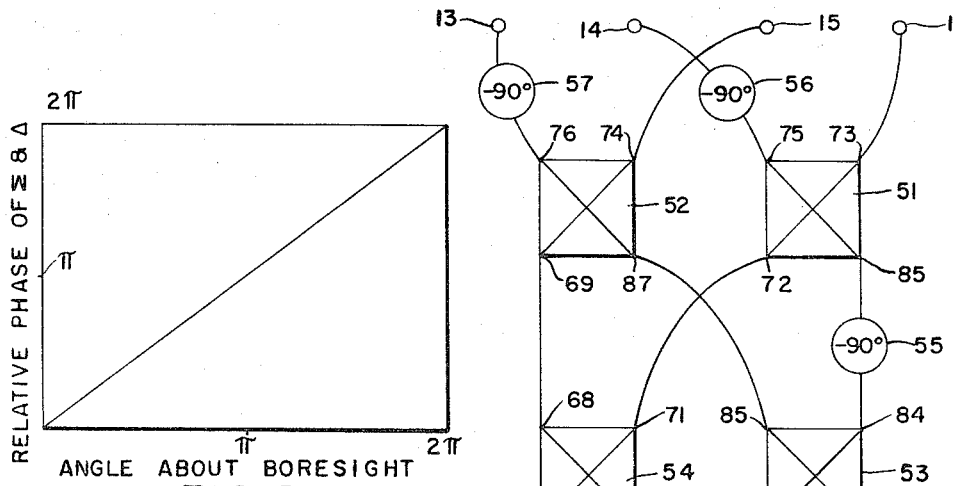
FIG. 8.
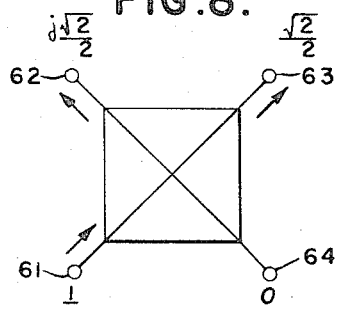
FIG. 10.
FIG. 9.
INVENTOR
John Paul Shelton, Jr.

INVENTOR
John Paul Shelton, Jr.

Sept. 26, 1967 JAMES E. WEBB 3,344,425
ADMINISTRATOR OF THE NATIONAL AERONAUTICS
AND SPACE ADMINISTRATION
MONOPULSE TRACKING SYSTEM
Filed June 13, 1966 6 Sheets-Sheet 4

INVENTOR
John Paul Shelton, Jr.

BY

ATTORNEYS

Sept. 26, 1967 JAMES E. WEBB 3,344,425
ADMINISTRATOR OF THE NATIONAL AERONAUTICS
AND SPACE ADMINISTRATION
MONOPULSE TRACKING SYSTEM
Filed June 13, 1966 6 Sheets-Sheet 5

INVENTOR
John Paul Shelton, Jr.

BY

ATTORNEYS

United States Patent Office 3,344,425
Patented Sept. 26, 1967

3,344,425
MONOPULSE TRACKING SYSTEM
James E. Webb, Administrator of the National Aeronautics and Space Administration, with respect to an invention of John Paul Shelton, Jr., Bethesda, Md.
Filed June 13, 1966, Ser. No. 557,871
36 Claims. (Cl. 343—16)

ABSTRACT OF THE DISCLOSURE

A spiral array having three or more radiating elements or a log-periodic array simulating the characteristics of such a spiral array, is operated to excite a parabolic dish. In the case where the spiral array has four radiating elements, these elements are connected through a hybrid network to derive sum and difference signals which are phase compared to develop azimuth and elevation information. The inclusions of a larger number of radiating elements increases the angle at which a target can be detected relative to the antenna boresight axis.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates generally to monopulse tracking systems, and more particularly to a monopulse tracking system having an antenna array of at least three radiators for deriving circularly polarized sum and difference mode patterns.

Conventional prior art monopulse, i.e., simultaneous lobe comparison, tracking systems for deriving both azimuth and elevation indications have generally included four mutually orthogonal radiators for deriving sum and difference mode patterns that are linearly polarized in two orthogonal directions. The responses of two aligned radiators in each of the directions are subtracted from each other to derive a pair of orthogonal difference mode signals, each of which indicates the array response along the axis of the aligned radiator pair, while a sum mode response is derived by adding the responses of all four radiators. The difference modes of the two orthogonal directions are separately compared with the sum mode to derive azimuth and elevation indications of target location. To derive the two indications with this typical approach, it is necessary for three microwave signals, the sum signal and the two difference signals, to be fed from the tracking system antenna to a detector. It is desirable in many instances, however, to minimize the number of microwave signals between the antenna and detector, whereby errors due to noise and differences in transmission line distance are reduced.

One approach suggested by the prior art to reduce the number of microwave transmission paths between the tracking system antenna and the detector to only a pair of lines involves a pair of spiral feeds. The pair of spiral feeds is excited with sum and difference modes to derive circularly polarized patterns. As in the case of linearly polarized monopulse systems, the circular polarization sum and difference mode patterns respectively have a maximum and substantially a null along the antenna boresight axis. In contrast to the linearly excited monopulse array, however, the circularly excited array has symmetry through every plane of the boresight axis, not only through the two mutually orthogonal planes corresponding with azimuth and elevation.

In the proposed prior art circularly polarized monopulse system, information in one coordinate direction is obtained by phase comparing the sum mode and difference mode signals derived directly from the antenna array. The direction information in the other coordinate axis is generated by phase comparing the sum and difference mode signals after the difference mode signal has been phase shifted by 90°.

Attempts to construct a monopulse system having circular polarization derived from a pair of spiral feeds have proved unsatisfactory. In particular, it has been found that the sum and difference mode impedances with a radiator employing only two spirals are so different that it is virtually impossible to provide an efficiently operating system. With a two arm spiral, the difference mode has a relatively large impedance of 500 to 1000 ohms from one of the spiral conductors to ground while the sum mode has the relatively low impedance of between 50 and 100 ohms between one conductor and ground.

Because of the relatively wide divergence between the impedance to ground of the sum and difference modes of a two arm spiral, it is impossible to couple efficiently energy between the radiator and the excitation network therefor. If the difference mode is matched with the excitation network, the energy derived for the sum mode is insufficient, in many instances, to enable meaningful signals to be derived while the opposite occurs when the sum mode of the antenna is matched to the excitation network. If the excitation network and the transmission line between it and the two arm spiral antenna has a characteristic impedance that is a compromise between the characteristic impedances of the sum and difference modes, the mismatch is still too severe to enable meaningful signals to be derived, whereby no information is obtained in either the sum or difference mode for many targets.

It has been discovered that the mismatch problems between the two modes of the prior art two arm spiral can be minimized sufficiently to enable efficient coupling between a monopulse excitation network and a monopulse circular radiator if at least three radiators are provided. In a radiator formed as a spiral having in excess of two arms, the phase difference between adjacent conductors of the spirals is such that appreciable currents of approximately the same magnitude flow between the spiral arms in response to both sum and difference mode excitations. In contrast, a two arm spiral excited in the difference mode has virtually no current flowing between the arms thereof; instead, the current flows from the spiral arms to a conductor carrying current back to the excitation network. Oppositely, however, in the sum mode, the two arm spiral has appreciable current flowing between adjacent conductors because appreciable segments thereof are always 180° out of phase with respect to each other.

These differences of impedance between the two modes are not as severe with a multiple arm (i.e., more than two) spiral. To consider the specific example of a four arm spiral, in the sum mode there is a 90° phase displacement between adjacent conductors toward the center of the array, whereby a 180° phase difference exists between every other conductor. In consequence, current flows between every other conductor of a four arm spiral when exicited in the sum mode. In the difference mode, adjacent conductors close to the center of a four arm spiral have opposite phases so that current flows between them. Because the distance traveled by the currents in a four arm spiral excited in the sum mode is therefore approximately twice the distance traveled by currents in the difference mode, the impedances of the two modes are on the same order of magnitude. Thereby, energy can be efficiently coupled to the radiator in both modes if the characteristic impedance of the excitation network and transmission line is a compromise between the sum and difference mode impedances of the antenna array.

While the sum and difference mode impedances of a three arm radiator are sufficiently alike to enable efficient coupling of energy to them, it has been noted that a three arm radiator is not advantageously employed in a monopulse tracking system. In particular, it has been found that the difference mode of a three arm radiator has its null removed from the boresight axis whereby errors in the elevation and azimuth indications results.

Translation of the null for the difference mode from the bore sight axis with three arm spiral radiators occurs in response to energy reflected from the ends of the separate radiators. The energy reflected from the ends of the spiral radiators is transformed into a sum mode of the opposite sense of circular polarization. When this mode radiates, it has the effect of displacing the null for the difference mode. In particular, for each possible linear polarization, with all possible orientations, the null is displaced in a different direction off the boresight axis. Since the antenna is generally intended to receive linearly polarized signals, as well as circular, this characteristic is undesirable.

Circular polarization radiators having four or more arms, however, have been found to exhibit nulls in the difference mode precisely along the boresight axis. Reflected difference mode energy with arrays having at least four arms is not a problem because the energy is transformed into a mode other than the sum mode. Since all modes except the sum mode have boresight nulls, this energy, when radiated, has a boresight null and does not influence the null of the difference mode.

In a preferred embodiment of the present invention, an antenna array having at least four arms is excited by a microwave network of hybrids and phase shifters arranged to have sum and difference excitation ports. The received signals at the sum and difference ports of the excitation network are supplied to separate superheterodyne receiver channels so that a pair of I.F. signals is derived. The I.F. difference signal is compared in phase with the sum signal to derive information indicative of the target location in one of the coordinate directions while the other coordinate direction information is generated by phase shifting the sum I.F. signal by 90° and phase comparing the phase shifted difference signals.

Another feature of the present invention relates to increasing the acquisition angle of a monopulse system. As is well known, in conventional monopulse systems the acquisition angle, i.e., the angle at which a target can be located off the antenna boresight axis, is relatively small, being limited to the relatively narrow width of the sum mode pattern which has a diameter of approximately $\lambda/\pi$, where $\lambda$ is the wave length of the radiated energy and $\pi$ is approximately 3.14159. Since target acquisition data is derived in response to a comparison between the sum and difference modes, the narrower sum mode pattern determines the system acquisition angle. It has been found that the acquisition angle can be increased materially if radiators having in excess of four arms are employed, such that multiple difference mode signals are derived and adjacent difference mode signals are compared with each other.

In a particular embodiment of the present invention, eight spiral radiators are interconnected with an array of hybrids and phase shifters to derive a sum signal, a first difference signal for indicating azimuth and elevation, and five additional difference signals. The radiators illuminate a lens or parabolic reflector to excite far field patterns. The sum and difference modes of the eight arm spiral radiator have the usual radiation diameters of $\lambda/\pi$ and $2\lambda/\pi$, respectively, while the higher difference modes have radiating diameters integrally increasing from $3\lambda/\pi$ to $7\lambda/\pi$. The price paid for deriving the higher acquisition modes is in lower maximum amplitude of each succeeding difference mode, with its correspondingly larger angular coverage. The gain of the higher difference mode patterns is considerably greater, however, than the gain of existing systems utilized for increasing the acquisition angle of monopulse systems.

Another arrangement whereby the acquisition angle of a circularly polarized antenna array is materially increased is by utilizing an array of eight log-periodic radiators. Each of the eight log-periodic radiators has an excitation terminal or port located in a circle having relatively small diameter. The arms of the elements extend radially outwardly from the excitation terminals, with connections being made to log-periodically arranged elements that are coupled with each other and extend circumferentially in a circle to simulate approximately a spiral radiator. The eight excitation terminals of the log-periodic radiators are connected with a hybrid and phase shifting network that has six output terminals, one for the sum, first difference, and second difference modes of both circular polarization directions. The radiating diameters of the second difference modes are $3\lambda/\pi$ while the radiating diameters of the sum and first difference modes are $\lambda/\pi$ and $2\lambda/\pi$. The inherent excitation of the arrays in both the left and right circular polarizations enables targets of arbitrary polarization to be tracked on the same frequency with exactly the same antenna and transmitter.

It is accordingly, an object of the present invention to provide a new and improved monopulse tracking system.

Another object of the present invention is to provide a new and improved monopulse tracking system wherein circularly polarized signals are derived.

It is a further object of the present invention to provide a new and improved monopulse tracking system wherein only two microwave channels are required to feed the sum and difference information for two orthogonal coordinate directions between the antenna and detector.

It is another object of the present invention to provide a monopulse tracking system having circularly polarized radiation patterns, wherein energy is coupled efficiently in both the sum and difference modes between the excitation network and the radiator array.

A further object of the present invention is to provide a new and improved circularly polarized monopulse tracking system wherein the difference mode pattern has a null substantially along the boresight of the antenna array.

An additional object of the present invention is to provide a new and improved monopulse tracking system employing in excess of two spiral radiators wherein the difference mode pattern has a null along the boresight of the antenna array.

Still a further object of the present invention is to provide a new and improved monopulse tracking system having circular polarization patterns derived from an antenna array having in excess of three radiators.

Yet an additional object of the present invention is to provide a monopulse tracking system having relatively large acquisition angles.

Yet still a further object of the present invention is to provide a monopulse tracking system from which circular polarizations in opposite directions can be simultaneously derived at the same frequency.

Yet a further object of the present invention is to provide a monopulse tracking system having difference modes with radiation diameters in excess of $2\lambda/\pi$, where $\lambda$ is the wavelength of the transmitted energy.

Still another object of the present invention is to provide a monopulse tracking system having a difference mode with an acquisition angle seven times greater than the first difference mode pattern.

Another object of the invention is to provide an antenna array that performs in a manner similar to a spiral array but which can be driven simultaneously with oppositely polarized circular energy.

A further object of the invention is to provide a new and improved log-periodic antenna array.

The above and still further objects, features and advantages of the present invention will become apparent upon consideration of the following detailed description of several specific embodiments thereof, especially when taken in conjunction with the accompanying drawings, wherein:

FIGURE 1 is a block diagram of one preferred embodiment of the present invention employing a four arm spiral radiator;

FIGURE 2 is a front view of a preferred embodiment of the antenna utilized with the tracking system of FIGURE 1;

FIGURE 3 is a side view, partially in section, of the antenna of FIGURE 2;

Figure 11:
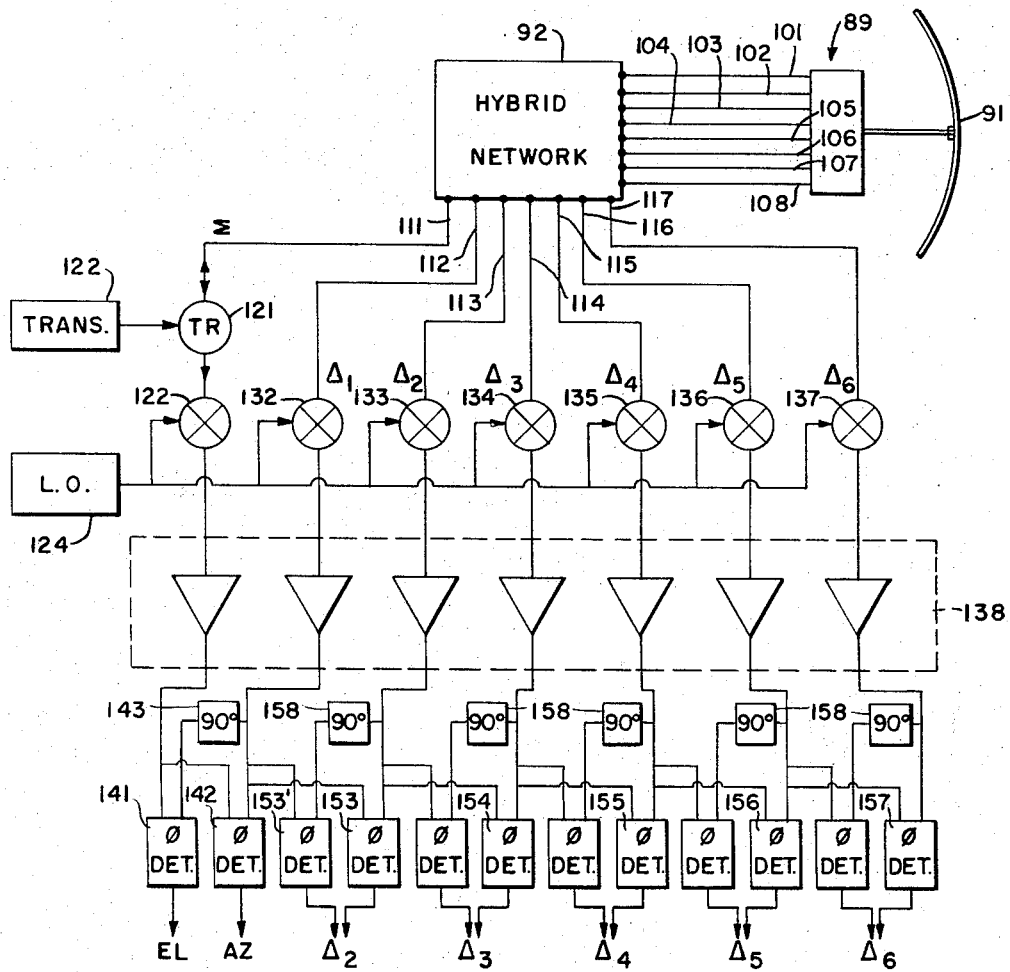
Figure 12:
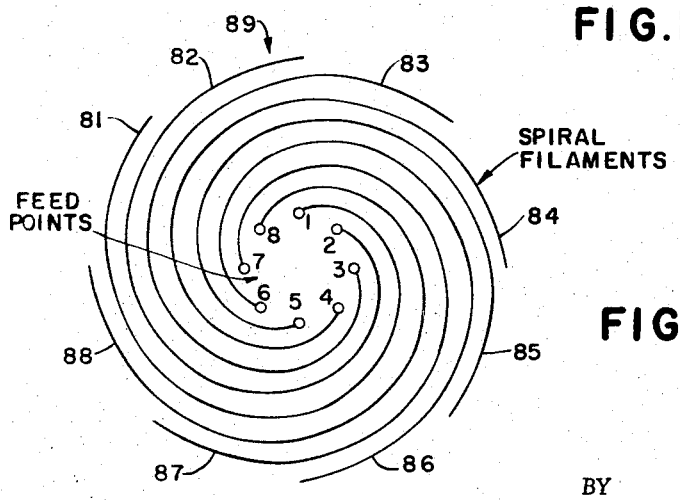
Figure 13:
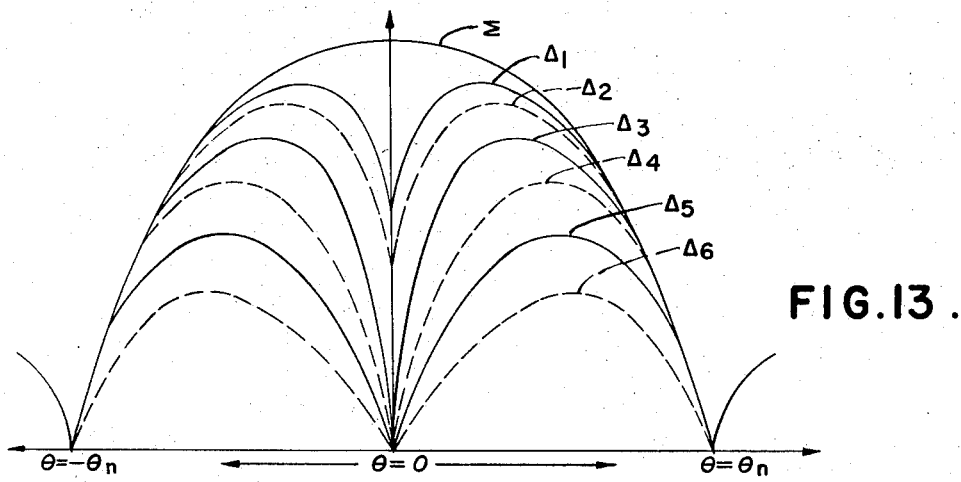
Figure 14:
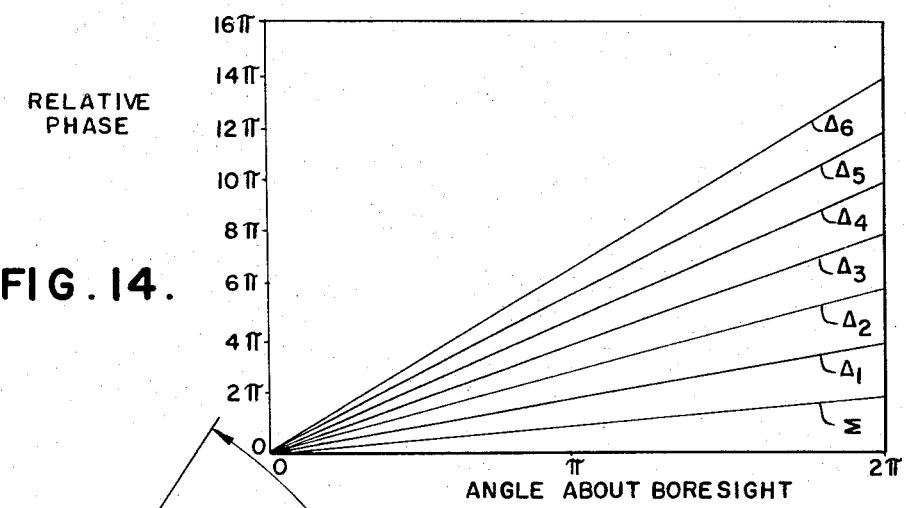
Figure 15:
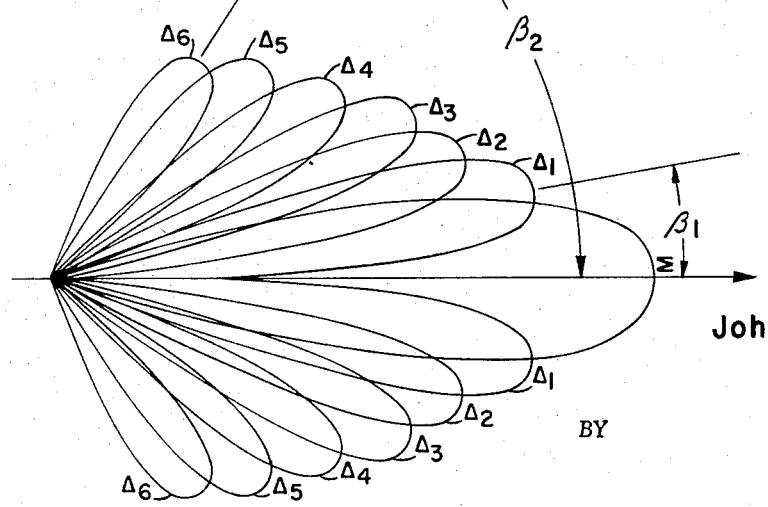
Figure 16:
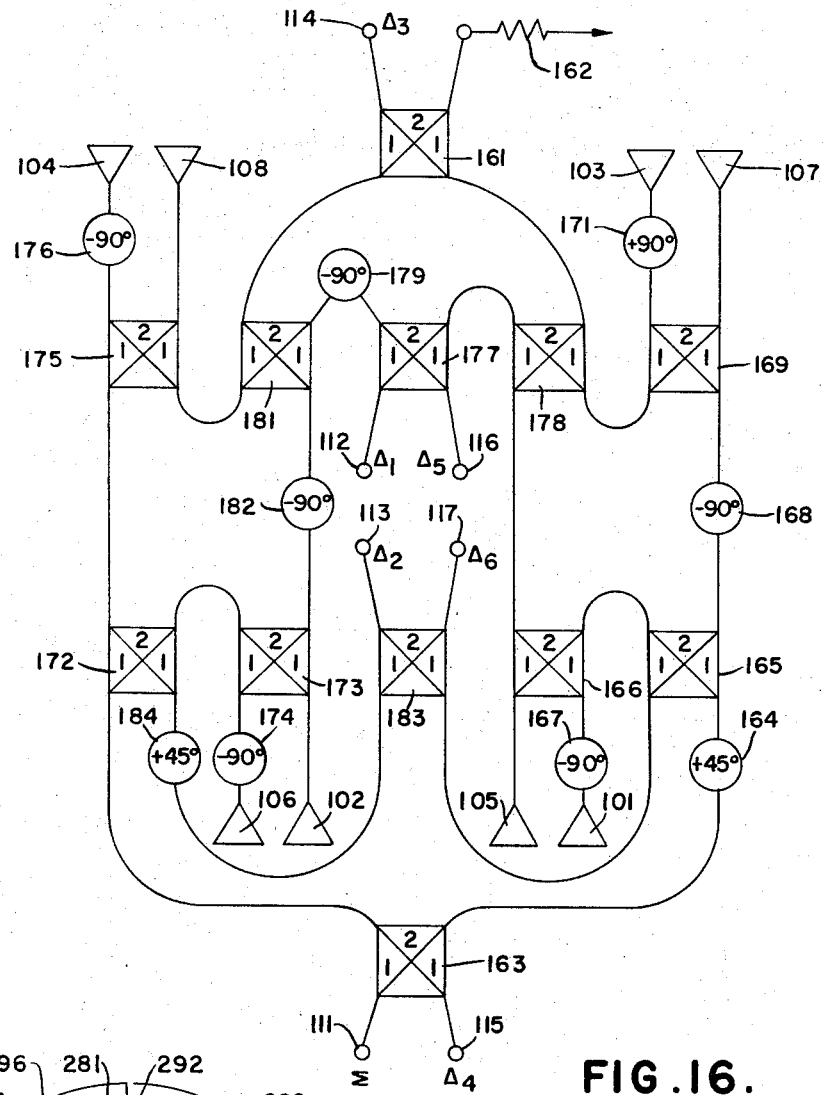
Figure 17:
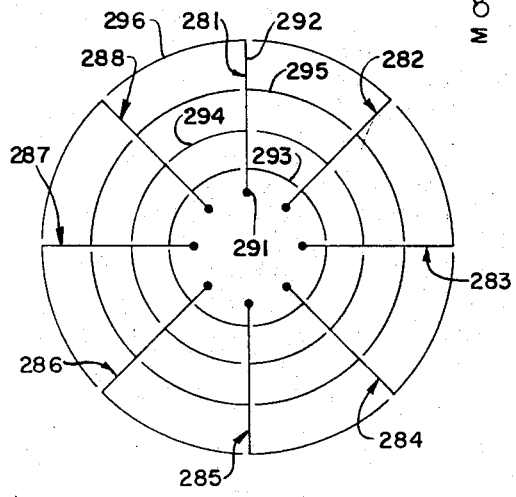
Figure 18:
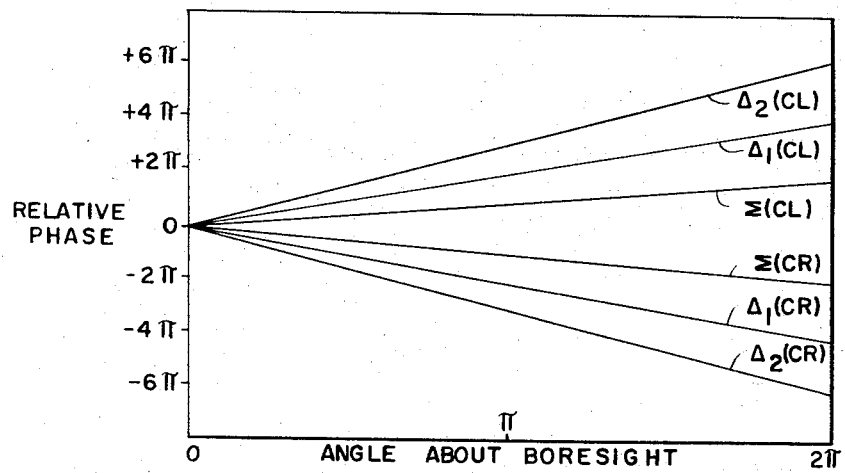
Figure 19:
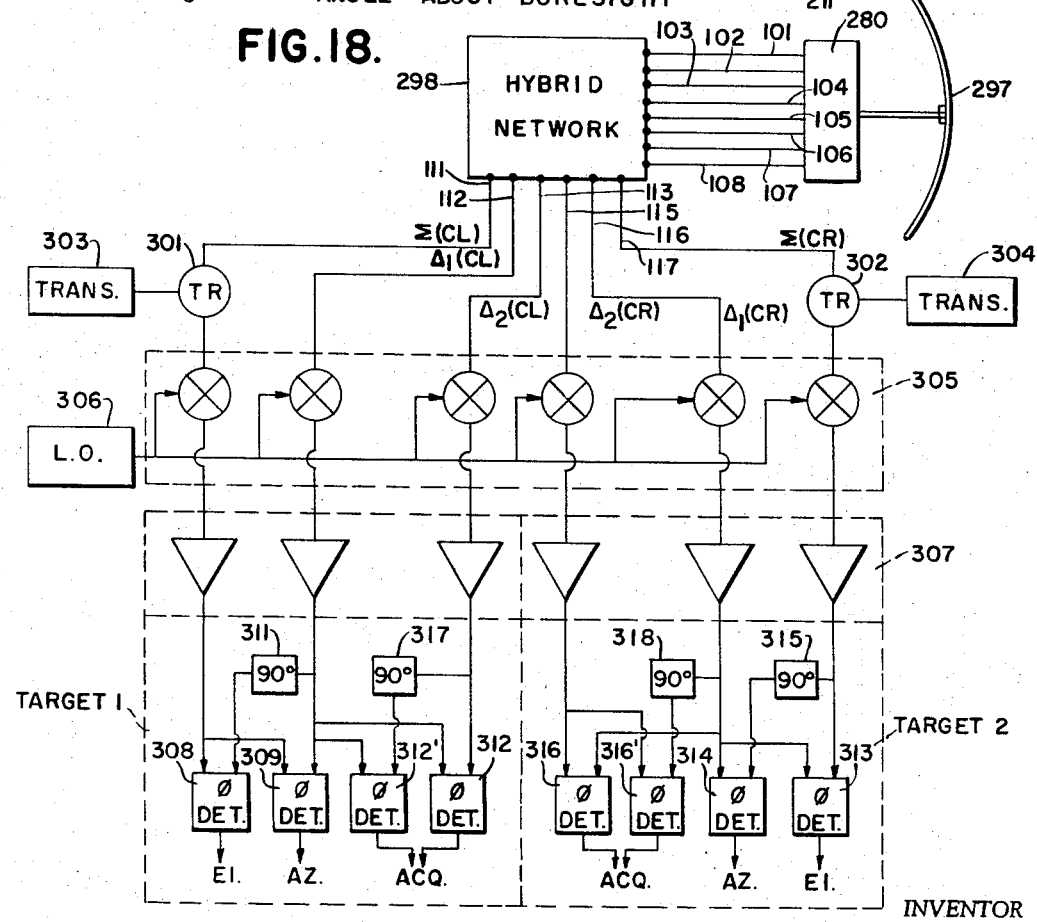

FIGURE 4 diagrammatically illustrates the instantaneous aperture field components in response to the radiator array of FIGURE 2 being excited in the difference mode;

FIGURE 5 is a schematic illustration of the instantaneous aperture field components in response to the radiator array of FIGURE 2 being excited in the sum mode;

FIGURE 6 is an illustration of the relative amplitudes of the sum and difference mode patterns for the radiator array of FIGURE 2, as a function of angle off the boresight axis;

FIGURE 6a is an illustration graphically depicting the meaning of the angle $\theta$ in FIGURE 6;

FIGURE 7 is an illustration of the relative amplitudes of the sum and difference mode patterns derived from a parabolic radiator excited by the radiator array of FIGURE 2;

FIGURE 8 is a graph indicating the relative R.F. phases of the sum and difference modes of the array of FIGURE 2, plotted as a function of angle about the antenna boresight axis;

FIGURE 9 is a schematic diagram of a preferred embodiment for the hydrid network of FIGURE 1;

FIGURE 10 is a schematic illustration indicative of what functions are performed by the hydrids of FIGURE 9;

FIGURE 11 is a schematic diagram of still a further embodiment of the present invention employing an eight arm spiral radiator;

FIGURE 12 is a top plan view of an antenna radiator array that is employed with one embodiment of the network illustrated by FIGURE 11;

FIGURE 13 shows relative amplitude patterns of the several excitation modes for the array of FIGURE 12;

FIGURE 14 is a plot of angle about the boresight axis of the antenna of FIGURE 12 versus relative phase for the several excitation modes thereof;

FIGURE 15 is a plot of relative amplitude patterns of a parabolic dish excited by the spiral radiator array of FIGURE 12;

FIGURE 16 is a circuit diagram of the hybrid network utilized for exciting the radiator array of FIGURE 11;

FIGURE 17 is a front plan view of an embodiment of an antenna array having a plurality of log-periodic elements arranged to simulate a spiral radiator;

FIGURE 18 illustrates plots of boresight angle versus relative phase for several excitation modes of the radiator array of FIGURE 17; and FIGURE 19 is a block diagram of a further embodiment of the present invention employing the radiator of FIGURE 17.

Reference is now made specifically to FIGURE 1 of the drawings wherein there is disclosed schematically a plurality of radiators 11 positioned at the focal point of parabolic reflector 12. Radiator array 11 includes four excitation ports 13, 14, 15 and 16, that are interconnected with hybrid network 17. Hybrid network 17 includes an additional pair of ports, sum port 18 and difference port 19. Sum port 18 is connected to microwave transmitter 21, of the conventional radar type, through transmit-receive (TR) network 22. If the system is employed solely as a tracking system, transmitter 21 and network 22 are not required; in such a case the energy for exciting the tracking system is derived from the target or an adjacent transmitter. Sum and difference ports 18 and 19 are connected to mixers 23 and 24, respectively, which are driven in parallel by the output of local oscillator 25.

I.F. output signals are derived from mixers 23 and 24, and applied to I.F. amplifiers 26 and 27. The relatively low frequency output of amplifier 26 is applied in parallel to the inputs of phase detectors 28 and 29, the other inputs of which are responsive to signals derived from the output of amplifier 27. Phase detector 29 is responsive directly to the output of amplifier 27 while phase detector 28 is connected with amplifier 27 via phase shifter 31 that cause the I.F. frequency to be advanced in phase by 90°. As seen infra, the D.C. signals derived from phase detectors 28 and 29 have magnitudes directly porportional to the elevation and azimuth of a target relative to the boresight axis of the antenna system comprising radiator array 11 and parabolic reflectors 12.

Reference is now made to FIGURES 2 and 3 of the drawings which illustrate a preferred embodiment for the radiator array 11 of the radar of FIGURE 1. As seen by the top view, FIGURE 2, the radiator array comprises four relatively wide bandwidth equal length spirals, which may be either of the equiangular or Archimedean type. The four spirals 32–35 are respectively connected to excitation ports 13–16 of hybrid network 17. The innermost portions of spirals 32–35 are mutually orthogonal, i.e., located at the corners of an imaginary square. Thereby, spirals 32 and 34 terminate on the horizontal bisector of the radiator array at the left and right sides of the array center, respectively, while spirals 33 and 35 terminate on the vertical bisector of the array, above and below the array center point, respectively. Each of frequency independent spirals 32–35 makes approximately three complete revolutions, with the outermost ends thereof being mutually orthogonal, to form an array having a diameter of $4\lambda/\pi$.

The innermost ends of spirals 32–35 are preferably excited by ports 13–16 of hybrid network 17 to derive a wave of circularly polarized energy in the right hand direction. Left circularly polarized waves can be derived by connecting excitation ports 13–16 of hybrid network 17 to the outermost ends of spirals 32–35. It has been found, however, that the antenna response is not as favorable when the spirals are driven from their outer ends.

Spirals 32–35 are formed as conducting metallic members on dielectric surface 36 utilizing techniques similar to those employed in the printed circuit art. Dielectric board 36 is mounted on metallic housing or cavity 37, and is positioned approximately a quarter wavelength of the frequency generated by transmitter 21 from the back metal wall of the cavity. Since dielectric board 36 is positioned towards parabolic reflector 12, substantially all of the energy derived from spirals 32–35 is transmitted away from cavity 37, being directed at parabolic reflector 12. The inner conductors 44 of four coaxial cables 45 connecting the outputs of hybrid network 17 are connected through appropriately provided apertures in the back wall of cavity 37 to enable connections to be established to the innermost ends of spirals 32–35. The shield or outer conductors of coaxial cables 43 are connected to cavity 37, whereby the cavity is effectively at ground potential.

Hybrid network 17 is arranged so that excitation of sum mode port 18 results in each of ports 13–16 deriving a wave that is displaced 90° from the wave derived from the adjacent port. In other words, excitation of input port 18 of hybrid network 17 causes ports 13, 14, 15 and 16 to be excited with voltages that have relative phases of 0, $\pi/2$, $\pi$, and $3\pi/2$ radians Hybrid network 17 is also arranged so that excitation of difference mode port 19 causes adjacent ones of ports 13–16 to be excited with voltages displaced in phase by $\pi$ radians, i.e., the relative phases of the voltages on leads 13, 14, 15 and 16 are respectively 0, $\pi$, 0 and $\pi$ radians.

Because spirals 32–35 have their input terminals displaced from each other by 90° and the excitation signals applied to these spirals are phase displaced by 90° at any instant, when excited by the sum mode, the electric field vectors at any instant are aligned at a radius of $\lambda/2\pi$. FIGURE 5 indicates the direction of the vectors at the time instant when maximum positive voltage is applied to terminal 14 and spiral 33. At such an instant, zero voltage is fed to terminals 13 and 15 while maximum negative voltage is applied to terminal 16. Because of the phase relationship indicated, equal magnitude positive and negative currents flow in spirals 33 and 35 and no current flows through spirals 32 and 34. The current distribution produces a pair of electric field vectors in the vertical plane that have the same direction. The currents in the horizontal plane are in opposite directions, whereby zero electric field is derived. At radii along the spiral array farther removed from the center than $\lambda/2\pi$, indicated by circle 42, both the vertical and horizontal components cancel, so that the effective radiating diameter of the sum mode energy is $\lambda/\pi$. In response to the R.F. energy exciting spirals 32–35 going through a complete cycle, the electric field is rotated about the center of array 11 to derive a circularly polarized pattern in the right hand direction.

Excitation of hybrid network 17 by difference mode port 19, in contrast to sum mode excitation, causes the radiator array electric fields to be directed in two orthogonal directions at any instant, as indicated by FIGURE 4. At the instant being considered in FIGURE 4, it is assumed that maximum positive currents are applied to spirals 33 and 35 while maximum negative currents are being applied to spirals 32 and 34. The stated current relation causes electric fields of opposite polarities to be established in the horizontal and vertical planes at a radius of $\lambda/\pi$. At the center of the array, all of the vectors have equal and opposite amplitudes, whereby a null occurs. At a radius greater than $\lambda/\pi$ from the center of the array the electric fields established by the currents in spirals 32–35 tend to cancel, whereby the effective radiating diameter of array 11 for the difference mode is $2\lambda/\pi$, indicated by circle 43. In response to the R.F. excitation applied to spirals 32–35 going through one complete cycle, each of the vectors in the pattern of FIGURE 4 rotates 360°. Because the difference mode vector pattern repeats itself and the sum mode vector pattern does not, the apparent phase of the R.F. difference mode energy goes through 720° as the sum mode energy goes through 360°.

Hence, the sum and difference modes are different from each other in both amplitude and phase relationship. In the sum mode, maximum pattern amplitude occurs at the center of array 11 while in the difference mode a null exists at the array center and the apparent phase for the two modes is displaced by 360° for a complete rotation of the R.F. energy about the boresight axis.

As one moves away from the center of array 11, excited in the difference mode, the amplitude and phase of the energy are varied as a function of position. The manner in which amplitude varies as a function of distance from the center of the radiator is seen by assuming that energy is focused at point 41 that is a finite distance from array center and lies along a line equidistant between the downwardly directed vector and the vector extending to the right. Because point 41 is closer to the downwardly and rightwardly directed vectors than to the upwardly and leftwardly directed vectors, the former two vectors provide a greater contribution to the amplitude of the energy at point 41 than the latter two. In consequence, there is a finite difference between the upwardly and downwardly directed vectors and the rightwardly and leftwardly directed vectors. These finite orthogonal vector components are also of equal amplitude because point 41 lies along the bisector between the downwardly and rightwardly directed vectors. In consequence, the vector amplitude and phase is related to the position of the energy focussed at point 41.

In the manner described, it is believed evident that the focussing of energy by parabolic reflector 12 onto a point of radiator array 11 will cause a signal of variable amplitude and phase to be derived at difference mode port 19, depending upon the position at which the energy is focussed on the radiator array. In fact, it has been found that the phase of the voltage deriving from difference port 19 relative to the phase of the voltage at summation port 18 is a straight line function, as indicated by FIGURE 8, for any angle about the boresight axis of the antenna system comprising radiator array 11 and parabolic reflector 12.

In the plot of FIGURE 8, the designation angle about boresight is correlated with the angle relative to an imaginary line drawn from the center of the array, FIGURE 2, through the innermost terminal of spiral 33, which is connected to terminal 14. Angles proceed from this imaginary line in a counterclockwise direction so that, for example, energy received along the horizontal line defined by the center of the array, and the innermost terminal of spiral 34, connected to port 15, is displaced in phase by 90° from energy received along the previously mentioned vertically extending imaginary line.

The relative amplitudes of the sum and difference mode patterns of the energy derived from radiator array 11, through any angle about the center of the array, are illustrated in FIGURE 6. From FIGURE 6, it is noted that the sum mode has a maximum along the antenna boresight axis, i.e., the center of radiator array 11, while the difference mode pattern has a minimum at the boresight axis. It is also noted that the maximum response of the sum pattern is greater than either peak of the symmetrical difference patterns and that nulls in both patterns occur at an angle relative to the boresight axis. In FIGURE 6, it is to be understood that angle relative to the boresight axis is different from angle about the boresight axis, referred to in conjunction with FIGURE 8. Angle relative to boresight axis refers to the angle displaced from the boresight axis through the plane in which the axis is located, as indicated by the lines designated as $\theta=0$ and $\theta=\theta_n$, FIGURE 6a.

While the sum and difference mode patterns have nulls at approximately the same angle relative to the boresight axis, the radiating diameter of the sum mode is ½ that of the difference mode, $2\lambda/\pi$. The difference in diameter of the sum and difference modes is indicated by dashed lines 42 and 43, respectively, FIGURE 2. Because of the difference in radiating diameters of the sum and difference modes, the patterns of these modes have different diameters when the entire antenna, including parabolic reflector 12, is considered. As FIGURE 7, which shows plots of the relative amplitudes of the sum and difference mode patterns for the entire antenna system, indicates, the difference mode maximum is displaced from the sum mode by an angle of $\beta_1$.

The hybrid network 17 for establishing the sum and difference mode patterns produced by array 11 is illustrated in FIGURE 9. The circuit of FIGURE 9 comprises four 3 db hybrids 51–54 and three —90° phase shifters for the frequency of transmitter 21, which phase shifters are denominated as 55–57. Hybrids 51–54 and phase shifters 55–57 are connected between sum and difference ports 18 and 19 and ports 13–16 to which the spiral radiators are connected to provide the phase relationship for the sum and difference mode excitation of the four spiral radiators.

Each of hybrids 51–54 is of the bilateral type, having four ports 61–64, as indicated in FIGURE 10. Energy coupled to port 61 can be fed only to ports 62 and 63 and is decoupled from port 64. Similarly, energy fed to port 64 is propagated only to ports 62 and 63, the latter ports being isolated from each other when energy is applied thereto. The 3 db hybrid is constructed so that energy coupled into port 61 suffers 90° phase delay and 3 db attenuation in propagating to port 62, but undergoes 0° phase shift and 3 db attenuation in propagating to port 63. The opposite relationship holds in response to energy coupled into port 64. Generalizing, it is seen that energy coupled to an input port is propagated to the output port diagonally opposite from the input port with 0° phase shift, but is passed to an adjacent but non-isolated port with —90° phase shift.

Referring now again to FIGURE 9, sum excitation port 18 is connected to port 65 of hybrid 54 while port 66, which is isolated from port 65, is connected to ground through matching resistor 67. The port 68 of hybrid 54 having an orthogonal output relative to port 65 is connected to port 69 of hybrid 52. Port 71 of hybrid 54 which is opposite to port 65 is connected to port 72 of hybrid 51 through a direct connection. The diagonal ports 73 and 74 of hybrids 51 and 52 relative to ports 72 and 69 are connected directly to terminals 15 and 16 that feed the spirals 34 and 35 of radiator array 11. In contrast, the adjacent ports 75 and 76 of hybrids 51 and 52 relative to input ports 72 and 69 thereof are connected through —90° phase shifters 56 and 57 to terminals 14 and 13.

In response to excitation of sum port 18, the relative phases of the voltages at ports 13–16 are displaced in phase by 90°. This relationship is attained in the following manner: The energy at sum port 18 undergoes a phase shift of —90° as it propagates between the adjacent ports of hybrids 52 and 54 and is delayed a further —90° as it propagates from port 76 to terminal 13, as a result of phase shifter 57. In consequence, the voltage at terminal 13 can be considered as having a phase of —270° or —3π/2 radians. In propagating to terminal 14, the energy at port 18 undergoes zero phase shift in traversing the path through hybrid 54 between the diagonal ports 65 and 71 thereof. Propagating through hybrid 51 between the adjacent ports 72 and 75, the energy from sum port 18 undergoes a phase shift of —90°. As the energy from port 75 propagates to terminal 14 it passes through phase shifter 56 where it undergoes a further —90° phase shift, resulting in a total phase shift of —180°. The energy at terminal 18 propagates to terminal 15 via the path between the adjacent ports 65 and 68 of hybrid 54, hence suffers a 90° phase delay in propagating through hybrid 54. No further phase shift occurs in propagation of energy between port 68 and terminal 15, whereby energy arriving at terminal 15 from sum port 18 has a phase of —90°. Because sum port 18 and port 16 are connected to each other only through the diagonal ports of hybrids 51 and 54, no phase shift occurs in the propagation of energy through this path. It is thus seen that the relative phases of the energy at terminals 13, 14, 15 and 16, is at any instant 0, π/2, π, and 3π/2 radians.

Difference mode port 19 is connected to port 81 of hybrid 53 and is isolated from port 82 thereof, which is connected via a matching resistor 83 to ground. The port of hybrid 53 adjacent to port 81 is connected through —90° phase shifter 55 to port 85 of hybrid 51 while the diagonal port of hybrid 53 is connected to port 87 of hybrid 52. The connections described and illustrated cause ports 13, 14, 15 and 16 to be excited with voltages having phase relations of 0, π, 0 and π radians, respectively, in the following manner:

Difference mode port 19 excitation is coupled to terminal 13 with a phase shift of —90°, there being no phase shift through the paths comprised by the diagonal ports of hybrids 52 and 53. There is a —270° phase shift in the energy propagated between terminals 19 and 14 due to the phase delay between the adjacent ports 81 and 84 of hybrid 53 and phase shifters 55 and 56, with no phase delay through the diagonal ports 85 and 76 of hybrid 51. Energy propagated between difference mode port 19 and terminal 15 is phase shifted by —90° as it travels between ports 87 and 74 of hybrid 52, while no phase delay occurs within hybrid 53. Energy coupled to port 16 from port 19 undergoes two —90° phase shifts between the adjacent ports of hybrids 51 and 53 and suffers a further 90° phase lag in propagating through phase shifter 55. In consequence, there is a total of —270° phase shift in transmitting energy between ports 19 and 16. Because ports 14 and 16 both have a relative phase of —270° or —3π/2 radians and there is a —90° phase shift in the propagation of energy between port 19 and ports 13 and 15, it is seen that adjacent terminals 13–16, which are connected to adjacent spirals 32–35, FIGURE 2, are excited with voltages having relative phase displacements of 180°.

It is to be noted that the attenuation between either port 18 or port 19 and any of radiator excitation ports 13–16 is the same, 6 db. The 6 db attenuation between each of the stated ports occurs because two 3 db hybrids are interposed in each path between ports. Since the fixed 90° phase shifters can be assumed to introduce substantially zero attenuation, the relative amplitudes of the signals at ports 13–16 are the same for energization of sum or difference port 18 or 19.

It is to be understood that while the foregoing discussion has been directed to excitation of sum and difference ports 18 and 19, as if the system were in the transmit mode, the same patterns and operations occur in response to received signals because of the well-known theory of antenna and bilateral network reciprocity.

The angle at which a target can be determined relative to the boresight axis of the antenna comprising four arm spiral radiator array 11 and parabolic reflector 12 can be increased, theoretically, to twice the angle of the difference mode. To increase the acquisition angle of the antenna, ports 13, 14, 15 and 16 are excited with voltages having relative phases of 0, —π/2, —π, and —3π/2 radians. Such a pattern can be obtained by connecting port 66 of hybrid 54, FIGURE 9, to an amplitude detector through an I.F. stage, rather than through a matched impedance to ground.

Exciting ports 13–16 of spiral radiator array 11 with voltages displaced in phase by 0, —π/2, —π, and —3π/2 radians, respectively, results in a difference mode propagation having a radiation band of 3λ/π. Because the energy is radiated from spiral array 11 at a larger radial distance from the boresight axis than radiation in either the sum or difference modes previously discussed, the far field maximum of the entire antenna system, including parabolic reflector 12, is displaced at a greater angle from the boresight axis than in the other two cases. Because there is a greater separation, however, between the radiating points on the circle having a diameter of 3λ/π, the maximum amplitude of the pattern is less than for the sum and previously discussed difference modes.

Unfortunately, experiments conducted with four arm spirals excited to have a radiating diameter of 3λ/π have not proven particularly satisfactory. It has been found that the difference mode having a radiation diameter of 3λ/π does not have a null along the boresight axis so that erroneous indications of a target being in the region covered by the pattern are derived. Another deleterious effect observed is that energy is inefficiently coupled to the mode having a radiating diameter of $3\lambda/\pi$.

It has been discovered that target acquisition at greater angles off the boresight axis can be obtained by increasing the number of spirals beyond four. In one particular embodiment, FIGURE 12, eight frequency independent equiangular spiral conducting filaments 81–88 are provided, each spiral having its innermost end equally spaced about the circumference of a circle having its center coincident with the center of the array. Spiral filaments 81–88 comprising the eight arm array are mounted on a quarter wavelength conducting activity, in a manner precisely the same as the four arm spiral radiator, FIGURE 3. The eight arm spiral array, however, has a diameter of $8\lambda/\pi$, to enable radiation to be derived from greater radii than the four arm spiral. Increasing the diameter of the radiators in excess of $8\lambda/\pi$ serves no useful purpose, as radiation from beyond the radii stated does not occur to any substantial effect. Such radiation is cancelled because the vector sum of the currents for the various modes described effectively cancel over a finite area.

The eight arm spiral radiator array 89 of FIGURE 12 is connected in a radar receiver network as illustrated by FIGURE 11. The center of radiator array 89 is mounted at the focal point of parabolic reflector 91. Energy deriving from array 89 is directed toward reflector 91 and the combined antenna system generates a multiplicity of different radiation patterns, depending upon the excitation mode of radiator array 89.

Radiator array 89 is excited to seven different radiation modes by hybrid network 92. Hybrid network 92 includes a first set of eight terminals or ports 101–108 that are respectively connected to the innermost terminals of spirals 81–88. Hybrid network 92 connects ports 101–108 to an additional set of seven ports 111–117. Port 111, for exciting the sum mode of radiator array 89, is connected through TR switch 121 to transmitter 122. The sum mode port 111 is also connected through TR switch 121 to mixer 123 that is excited by local oscillator 124. Local oscillator 124 also drives each of mixers 132–137, respectively, responsive to the difference mode signals derived from ports 112–117, respectively. The difference frequency generated by each of mixers 123 and 132–137 is supplied to a different one of the amplifiers in I.F. amplifier bank 138.

The amplified I.F. signal corresponding with the sum mode signal, the signal derived from port 111, is supplied in parallel to phase detectors 141 and 142. The amplified I.F. signal corresponding with the first difference mode response, the signal deriving from port 112, is applied directly from the amplifier bank 138 to phase detector 142 but undergoes a 90° phase shift in phase shifter 143 prior to being applied to the input of phase detector 141. Phase detectors 141 and 142 derive D.C. output signals indicative of the elevation and azimuth position of a target being tracked relative to the boresight angle of reflector 91.

If the target being tracked is removed from the boresight axis of reflector 91 sufficiently to prevent a target indication from being derived from the sum and first difference mode ports 111 and 112, the I.F. signals derived from mixers 133–137 are utilized to provide a target indication. As is seen infra, the signals derived from ports 113–117, which are translated into I.F. signals deriving from mixers 133–137, have patterns removed from the boresight angles by progressively larger angles. Energy in any of the modes associated with ports 113–117 is detected by connecting the I.F. amplifiers of bank 138 to separate phase detectors 153–157 and 153'–157', respectively, responsive to the outputs of mixers 133–137. Phase detectors 153–157 are also responsive to the output of the adjacent, but lower order, difference mode I.F. amplifier, e.g., second difference mode phase detector 153 compares the phases of the first and second difference mode signals. In contrast, phase detectors 153'–157' are responsive directly to the outputs of the adjacent higher order difference mode I.F. amplifier but are fed by their mixers through 90° phase shifters 158; so that, for example, detector 153' responds directly to the $\Delta_1$ mode signal but the $\Delta_2$ mode signal fed thereto is 90° phase shifted.

The output signals of phase detectors 153–157 are utilized to indicate the approximate angle location of a target about the boresight axis, whereby the boresight axis of the antenna array comprising radiators 89 and parabolic reflector 91 can be directed generally toward the target. The amplitude of the phase detector output indicates the angle about the boresight axis where the target is located. The fact that a voltage is derived from a particular one of phase detectors 153–157 indicates the approximate angle off the boresight where the target is located. The quadrant where the target is located is derived by utilizing the additional phase detectors 153', 154', 155', 156' and 157' for each of the higher order modes. Each phase detector is responsive to the signal from the adjacently numbered lower difference mode and the difference mode signal for which the quadrant information is being derived, after it has been changed in phase 90° by phase shifters 158.

Of course, once the boresight axis of parabolic reflector 91 is directed in the same general direction as the target, the signals derived from phase detectors 141 and 142 provide the relative elevation and azimuth location of the target to the boresight axis.

To derive sum and difference mode patterns enabling elevation and azimuth information to be derived, as well as the acquisition information generated by detectors 153–157 from the eight arm spiral radiator 89, the eight spirals are energized at their innermost points with equal amplitude voltages having the phases indicated by Table I.

TABLE I.—PHASE EXCITATION

| Pattern Description | 81 | 82 | 83 | 84 | 85 | 86 | 87 | 88 | Radiating Diameter |
|---|---|---|---|---|---|---|---|---|---|
| Sum | 0 | $\pi/4$ | $\pi/2$ | $3\pi/4$ | $\pi$ | $5\pi/4$ | $6\pi/4$ | $7\pi/4$ | $\lambda/\pi$ |
| $\Delta_1$ | 0 | $\pi/2$ | $\pi$ | $3\pi/2$ | 0 | $\pi/2$ | $\pi$ | $3\pi/2$ | $2\lambda/\pi$ |
| $\Delta_2$ | 0 | $3\pi/4$ | $6\pi/4$ | $\pi/4$ | $\pi$ | $7\pi/4$ | $\pi/2$ | $5\pi/4$ | $3\lambda/\pi$ |
| $\Delta_3$ | 0 | $\pi$ | 0 | $\pi$ | 0 | $\pi$ | 0 | $\pi$ | $4\lambda/\pi$ |
| $\Delta_4$ | 0 | $-3\pi/4$ | $-6\pi/4$ | $-\pi/4$ | $-\pi$ | $-7\pi/4$ | $-\pi/2$ | $-5\pi/4$ | $5\lambda/\pi$ |
| $\Delta_5$ | 0 | $-\pi/2$ | $-\pi$ | $-3\pi/2$ | $-0$ | $-\pi/2$ | $-\pi$ | $-3\pi/2$ | $6\lambda/\pi$ |
| $\Delta_6$ | 0 | $-\pi/4$ | $-\pi/2$ | $-3\pi/4$ | $-\pi$ | $-5\pi/4$ | $-6\pi/4$ | $-7\pi/4$ | $7\lambda/\pi$ |

Interpreting Table I by way of a plurality of examples, the sum mode pattern is derived by feeding equal amplitude voltages that are displaced from each other by 45° or $\pi/4$ radians to adjacent input terminals of spirals 81–88. Hence, the voltage supplied to the input terminal, at the innermost point of spiral 81, has zero phase while the voltage supplied to spiral 82 has a phase of $\pi/4$ radians. It is seen that if an instant of time is chosen whereby a voltage $e$ is applied to spiral 81, a voltage of $0.707e$ is applied to spiral 82, and zero voltage is applied to spiral 83. For the remainder of spirals 84, 85, 86, 87 and 88, the voltages applied to them at the instant being considered are respectively $-0.707e$, $-e$, $-0.707e$, 0, $+0.707e$. Hence, the phase relationships of the currents supplied to the eight arm spiral, at any instant of time, are similar to those supplied to the four arm spiral of FIGURE 2, when it is excited in the sum mode.

Because of the relative phases of the voltages applied to spirals 81–88, when they are excited to the sum mode, all of the electric field vectors are directed in the same direction at any time instant. The maximum energy is coincident with the center of array 89 and falls off rather rapidly so that the effective sum mode radiating diameter is $\lambda/\pi$. At radii farther removed than $\lambda/2\pi$ from the center of array 89, the phases of the currents in the sum mode are such that substantial electric field cancellation occurs and the amount of energy transmitted can be ignored. As the energy applied to spirals 81–88 goes through a complete cycle, the electric field direction is rotated correspondingly so that the emitted radiation is circularly polarized. In consequence, the sum mode is rotated once about the boresight axis for each cycle of radiation applied to spiral filaments 81–88.

The first difference mode, $\Delta_1$, utilized for deriving the azimuth and elevation information is obtained by supplying adjacent ones of spirals 81–88 with voltages displaced in phase by $+90°$. Hence, at an instant of time when the voltage applied to spiral 81 has a maximum value, $E_m$, zero voltage is applied to spiral 82 and $-E_m$ is applied to spiral 83. Continuing for spirals 84, 85, 86, 87 and 88, the voltages applied thereto are respectively, 0, $E_m$, 0, $-E_m$ and 0. The similarity between the instantaneous currents supplied to the four arm spiral of FIGURE 2, for the difference mode, $\Delta_1$, thereof is to be noted.

In the eight arm spiral of FIGURE 12, for the instant being considered, no current is supplied to spirals 82, 84, 86 and 88, while maximum currents are supplied to spirals 81 and 85 and maximum negative currents are supplied to spirals 83 and 87. This is precisely the same relationship that occurs with the four arm spiral of FIGURE 2 when maximum current is supplied to spiral 33. By analogy, it is seen that the instantaneous electric field at the aperture of the eight arm spiral of FIGURE 12 is the same as illustrated by FIGURE 4 for the four arm spiral. In consequence, excitation of eight arm spiral array 89 in accordance with the $\Delta_1$ phase excitation pattern results in the derivation of phase information indicative of the target elevation and azimuth.

At any instant of time, radiation is derived from two sets of opposite points of array 89 in response to excitation in the $\Delta_1$ mode. A substantial null exists along the boresight axis since the vector sum of the electric fields at that point is zero at any instant of time. As the energy applied to spirals 81–88 goes through a cycle, the four centers of radiation rotate. Because there are four radiation centers, as opposed to two for the sum mode, the phase of the first difference effectively goes through 720° while the phase of the sum mode pattern goes through 360°.

As in the case of the four arm spiral, the $\Delta_1$ mode of eight arm array 89 has an effective radiation diameter of $2\lambda/\pi$. At radial points greater than $\lambda/\pi$, the phases of the $\Delta_1$ mode excitation currents produce electric fields that effectively cancel each other to preclude substantial radiation.

It is believed from the descriptions of the manner in which eight arm spiral array 89 derives the sum and first difference ($\Delta_1$) modes, that the manner in which the second and third difference modes ($\Delta_2$ and $\Delta_3$, respectively) are obtained is obvious by considering Table I. It is noted from Table I that the effective radiating diameter of energy in the second and third difference modes is effectively $3\lambda/\pi$ and $4\lambda/\pi$, whereby the acquisition angle for targets off the boresight axis is linearly increased from one mode to the next, when the antenna is used as feed to reflector 91.

It is noted from table that the fourth, fifth and sixth difference modes are derived by supplying spirals 81–88 with energy having phases merely reversed from the phases utilized to derive the second difference, first difference and sum modes. At first glance, it would seem that merely reversing the phase of the energy applied to spirals 81–88 would reverse the polarization direction of the energy derived from the array. With spiral antennas, however, the polarization direction of the energy derived is governed by the direction in which the wave is propagated along the transmission lines comprising the various spiral elements. Thus, patterns of opposite polarizations from those obtained by excitation of the innermost ends of spirals 81–88 are obtained from the same spirals only by exciting the outer ends thereof. The phase with which energy is applied to the input terminals of the spiral array has no control over the direction of polarization. Hence, exciting the innermost ends of spirals 81–88 with energy reversed in phase from another excitation pattern causes a different mode to be derived. In particular, the phase relationship indicated by Table I for $\Delta_4$ causes array 89 to exhibit a radiating diameter of $5\lambda/\pi$.

The relative amplitudes of the various modes as emitted from array 89 and from the total antenna comprising the array and parabolic reflector 91 are seen from FIGURES 13 and 15, respectively. From FIGURE 13, it is noted that the relative amplitude of each of the higher order modes is less than the preceding mode and that the maximum pattern amplitude of each higher order mode is displaced at a greater angle from the boresight axis than the preceding mode. It is also noted from FIGURE 13 that the null of each of the modes occurs at the same angle relative to the boresight as the energy emitted from the spiral radiator. The peak amplitudes of the various modes are, however, translated to cover progressively larger angles from the boresight axis after reflection from parabolic reflector 91, as indicated by the total antenna response curve of FIGURE 15.

Because the several modes are circularly polarized, each of the patterns illustrated in FIGURE 15 is rotated constantly about the boresight axis. The relative rate at which the different modes rotate about the boresight axis is different, however, for each mode. As indicated, supra, at any instant of time there are one and two patterns derived for the sum and $\Delta_1$ modes, respectively. Extending the analogy further, it is seen that at any instant of time there are 3, 4, 5, 6, 7 maximums for the $\Delta_2$, $\Delta_3$, $\Delta_4$, $\Delta_5$ and $\Delta_6$ modes, respectively. Each of the higher order mode patterns effectively changes in phase at a rate relative to the sum mode that is directly proportional to the ratios of the radiating diameters. This relationship is illustrated in FIGURE 14, wherein seven straight lines, one for each of the sum and six difference modes, are illustrated.

Excitation of terminals 101–108, connected to the terminals of spirals 81–88, respectively, with the seven different modes illustrated by Table I is accomplished by utilizing the twelve hybrid network of FIGURE 16. Each of the twelve hybrids of FIGURE 16 is of the same type illustrated and described supra, in conjunction with FIGURE 10. The arrangement of hybrid network 92 is symmetrical with each terminal of every hybrid, except one terminal of hybrid 161, connected to one of the excitation ports. The single mentioned terminal of hybrid 161 is connected to ground through matched resistive impedance 162.

Excitation of ports 101–108 in response to the sum signal applied to port 111 is initially between the diagonal ports of hybrid 163. From the port diagonally opposite from the summation port 111 of hybrid 163, energy propagates through $+45°$ phase shifter 164, the diagonal path through 3 db hybrid 165 and the adjacent port of hybrid 166 to $-90°$ phase shifter 167 to port 101. It is thus seen that energy propagating between ports 111 and 101 suffers a 135° phase delay.

Energy is coupled from port 111 to port 105 by substantially the same path as indicated for the propagation of energy between diagonally opposite ports of hybrid 166. In consequence, the energy coupled between ports 111 and 105 undergoes a phase shift of $+45°$, whereby the energy at port 105 is advanced 180° relative to the energy generated at port 101.

Energy from summation mode input port 111 also propagates through the diagonal of hybrid 163 and phase shifter 164 in travelling to ports 103 and 107. In propagating to the latter two ports, however, the summation mode energy undergoes a −90° phase shift in hybrid 165 and an additional −90° phase shift in phase shifter 168. The summation mode energy derived from −90° phase shifter 168 is split into two segments by hybrid 169, half being coupled to port 103 through the diagonal coupling, after having passed through +90° phase shifter 171. The remaining summation mode energy applied to hybrid 169 is retarded in phase by 90° as it passes between the adjacent ports of the hybrid, from which it is coupled to port 107.

Tracing the propagation paths between terminals 111 and 107 it is seen that a phase retardation of $5\pi/4$ radians occurs while a phase retardation of $\pi/4$ radians occurs between terminals 111 and 103. In consequence, the energy deriving from ports 103 and 107 is advanced by $\pi/2$ and $6\pi/4$ radians relative to that at port 101.

Port 115 which excites the $\Delta_4$ mode, excites ports 101, 103, 105 and 107 in substantially the same manner as they are excited by the summation mode applied to port 111. The difference in excitation paths is only through hybrid 163, wherein the summation mode is coupled between diagonal arms while the $\Delta_4$ difference mode is coupled between adjacent ports. In consequence the $\Delta_4$ mode energy arriving at ports 101, 103, 105 and 107 is merely phase shifted by −90° relative to sum mode excitation.

Sum and $\Delta_4$ mode ports 111 and 115 also excite ports 102, 104, 106 and 108 through substantially the same path, the only difference again being that the former undergoes a −90° phase shift in propagating through hybrid 163 while the latter does not. The propagation path between hybrid 163 and terminals 102 and 106 is initially through the diagonal ports of hybrid 172. From hybrid 172, the summation and $\Delta_4$ energy propagates to terminal 102 via the diagonal ports of hybrid 173. The sum and $\Delta_4$ modes propagate to terminal 106 from hybrid 172 through the adjacent ports of hybrid 173 and −90° phase shifter 174. It is thus seen that the $\Delta_4$ excitation mode propagates between ports 115 and 102 with zero phase shift while the summation mode propagates between these ports with a phase delay of 90°. The phase delay between ports 115 and 106 is −180° while between ports 111 and 106 it is −270°.

The sum and $\Delta_4$ mode energy from hybrid 163 is also coupled through the adjacent ports of hybrid 172 to ports 104 and 108. The coupling of energy from hybrid 172 to port 104 is via the adjacent ports of hybrid 175 and −90° phase shifter 176 so that a −180° phase shift is introduced. In contrast, the coupling of energy between hybrid 172 and terminal 108 is through the zero phase shift path between the opposite or diagonal ports of hybrid 175.

The propagation paths for the $\Delta_1$ and $\Delta_5$ modes from terminals 112 and 116, respectively, to terminals 101–108 are substantially the same, except for the initial energy flow through hybrid 177. Ports 112 and 116, respectively exciting the $\Delta_1$ and $\Delta_5$ modes are connected to the decoupled ports of hybrid 177, whereby there is a 90° phase shift between the propagating paths for these two modes. From the port of hybrid 177 opposite port 112, the propagation path to port 101 is via the adjacent ports of hybrid 178, the diagonal ports of hybrid 166 and −90° phase shifter 167. Substantially the same path is followed to reach port 105, except that propagation through hybrid 166 is between the adjacent ports thereof.

The $\Delta_1$ and $\Delta_5$ mode energies applied to hybrid 178 that is not coupled through the adjacent ports of the hybrid are coupled through the diagonal thereof to hybrid 169. At hybrid 169, the $\Delta_1$ and $\Delta_5$ energy is again split into two parts, one of which propagates with zero phase shift directly to terminal 107 and the other part propagating also with zero phase shift to terminal 103, but through the −90° phase shift introduced between the adjacent ports of hybrid 169 and the +90° phase shifter 171.

The $\Delta_1$ and $\Delta_5$ mode energy coupled to the port of hybrid 177 adjacent to port 112 is fed through −90° fixed phase shifter 179, and is coupled to hybrid 181. Half of the energy fed to hybrid 181 by phase shifter 179 is fed to hybrid 175 where it is again split into two parts. One part of the $\Delta_1$ and $\Delta_5$ mode energy supplied to hybrid 175 undergoes zero phase shift in propagating to the hybrid and then is phase delayed by 90° in phase shifter 176 prior to reaching port 104. The other part of the $\Delta_1$ and $\Delta_5$ mode energy reaching hybrid 175 is also delayed by 90°, but this energy is phase delayed by the hybrid, from whence it is coupled to port 108.

The other half of the $\Delta_1$ and $\Delta_5$ mode energy fed to hybrid 181 is phase shifted by −90° in propagating between adjacent ports of the hybrid and is phase shifted again by −90° by phase shifter 182. The energy derived from phase shifter 182 is coupled via the adjacent ports of hybrid 173 to port 102 so that it undergoes an additional 90° phase lag, is fed between the diagonal ports of hybrid 173 and on to port 106 via −90° phase shifter 174.

The propagation of energy for the $\Delta_2$ and $\Delta_6$ modes between ports 113 and 117 and ports 101–108 is now considered. The $\Delta_2$ and $\Delta_6$ modes excite adjacent but isolated ports of hybrid 183. The port of hybrid 183 opposite from port 113 responds to the vector sum of the $\Delta_2$ and $\Delta_6$ energy propagated through the adjacent ports of hybrid 165 and from the adjacent port thereof, travels by the same path indicated supra for the sum and $\Delta_4$ mode energy to terminals 101 and 105. The remaining $\Delta_2$ and $\Delta_6$ mode energy coupled to hybrid 165 propagates to the diagonal port thereof. From the diagonal port of hybrid 165, the $\Delta_2$ and $\Delta_6$ energy propagates to terminals 103 and 107 via the same path described supra for the sum and $\Delta_4$ energy.

The $\Delta_2$ and $\Delta_6$ energy combined as a vector sum at the port of hybrid 183 adjacent to port 113 is initially fed through +45° phase shifter 184. From phase shifter 184, the $\Delta_2$ and $\Delta_6$ mode energy is fed through adjacent ports of hybrid 172 to ports 102 and 106 via the same path as energy from hybrid 163. The other half of the energy supplied to hybrid 172 by phase shifter 184 is supplied to ports 104 and 108 by the same path as the sum and $\Delta_4$ energy coupled to these ports after propagating through hybrid 172.

The $\Delta_3$ mode energy excites port 114, isolated from the port of hybrid 161 to which matching resistor 162 is connected. The $\Delta_3$ mode energy propagates from the port of hybrid 161 adjacent to port 114 to hybrid 181 where it is split into two parts, one part being fed to hybrid 175 and the other being fed to phase shifter 182. The $\Delta_3$ energy propagated through hybrid 181 by these two paths takes the same path as indicated supra for the $\Delta_1$ and $\Delta_5$ modes in propagating to terminals 102, 104, 106 and 108.

The $\Delta_3$ energy exciting port 114 that is coupled through hybrid 161 via the opposite ports thereof is fed to one port of hybrid 178. At hybrid 178, the $\Delta_3$ mode energy is split into two parts, half going directly to hybrid 166 with zero phase shift while the other half is phase shifted −90° by hybrid 178 prior to being fed to hybrid 169. From hybrids 166 to 169, the $\Delta_3$ mode energy propagates to terminals 101, 103, 105 and 107 by precisely the same path as the $\Delta_1$ and $\Delta_5$ mode energies.

While the spiral radiator excitation has been described in conjunction with four and eight arm spirals, it is to be understood that the theory can be generalized to include arrays having M equiangularly spirals having equispaced terminal portions, where M is an integer in excess of 3. The relationship between the phases of the excitation signals for the various modes is indicated by Table II.

TABLE II

Interarm Phase Difference: $2\pi/M, 4\pi/M, \ldots \left(\frac{M}{2}-1\right)2\pi/M, \quad -\left(\frac{M}{2}-1\right)2\pi/M, \ldots -\frac{2\pi}{M}$ Mode No. (n): $\quad 0, \quad 1, \quad \ldots \left(\frac{M}{2}-2\right), \quad M/2-1, M/2, \quad \ldots (M-2)$ Phase Progression: $\quad 2\pi, \quad 4\pi, \quad \ldots \left(\frac{M}{2}-1\right)2\pi, \quad M\pi, \quad \left(\frac{M}{2}+1\right)2\pi, \quad \ldots (M-1)2\pi$ Description: $\quad \Sigma, \quad \Delta_1, \quad \ldots \Delta_{M/2-2}, \quad \Delta_{M/2-1}, \Delta_{M/2}, \quad \ldots \Delta_{M-1}$ An inspection of Table II indicates that there are M−1 modes, including the zero or sum mode, to which the spiral radiator can be excited. It has been found impossible to excite the radiator with a mode wherein the phase supplied to each spiral is the same. The impossibility occurs because excitation of all of the spiral elements with zero phase displacement causes a boresight axis current to be derived of approximately the same magnitude as the magnitude of the peak current at the displaced radius, where it is expected that radiation should occur. In consequence, in general it can be stated that a spiral array having M elements can be excited with M−1 modes. Table II also indicates, under the heading of "Phase Progression," the linear relationship between the number of revolutions per mode per revolution of energy about the boresight axis of the antenna.

While the spiral antenna arrays described have many desirable characteristics, they are unable to generate simultaneously both types of circular polarization. For many tracking situations, the target does not respond equally to both polarizations, whereby it is desirable to provide simultaneously patterns in both polarization directions, and preferably both patterns are at the same frequency. Because a system that emits circularly polarized energy in the left direction is incapable of receiving energy polarized in the right direction, and vice versa, complete isolation between the two polarization modes occurs, enabling the same array to be utilized deriving both polarizations. The principles of the present invention can be extended to derive circularly polarized energy in both directions by utilizing the antenna array of FIGURE 17 as radiator array 89, FIGURE 11.

The array of FIGURE 17 comprises eight frequency independent log-periodic elements 281–288 having excitation terminals equally spaced about a circle having its center coincident with the center of the array. Since each of the log-periodic elements 281–288 has the same configuration, a description of element 281 suffices for each of the remaining elements.

Port 291 of log-periodic element 281 is excited by the center conductor of the coaxial cable coupling energy from one of the ports of a hybrid network to the array. Excitation port 291 is connected to conductor 292 that extends radially outward from the center of the array to a point approximately 2.2λ removed from the center point of the array.

Spaced along and connected to conductor 292, on alternate sides thereof, are unipole, open-circuited conductors 293, 294, 295, and 296. Conductors 293–296 are spaced along conductor 292 in accordance with the well known log-periodic relationship. The length of conductors 293–296 is also governed by the well known log-periodic relationship. Conductors 293–296 are arcuate, scanning an angle that is slightly less than 45°. Because adjacent ones of conductors 193–196 are on opposite sides of conductor 192 the arcuate conductors are considered as being interleaved with the arcuate conductors of the adjacent log-periodic element.

By interleaving the conductors of the several log-periodic elements and arranging the several elements at equal angles about the center of the array, sum and difference mode patterns substantially like those of a spiral can be derived. The log-periodic array of elements 181–188, however, can simultaneously derive oppositely polarized circular waves because each of the elements is inherently a linear source of electromagnetic waves. In consequence, the phase rotation direction of energy sequentially applied to the input terminals of elements 181–188 determines the polarization direction of the circularly polarized waves derived.

The planar array of FIGURE 17 is mounted in a cavity having a quarter wavelength depth, as shown by FIGURE 3. Each of the outer conductors of the several coaxial cables connected to the excitation ports 291 of the several log-periodic elements 281–288 is connected to the conducting surface of the cavity at its back wall.

The radiator array of FIGURE 17 is excited with equal amplitude waves as indicated by Table III to derive left and right circularly polarized patterns for the sum, first difference ($\Delta_1$) and second difference ($\Delta_2$) or acquisition modes, in accordance with Table III.

TABLE III

| Pattern | Polarization | 1 | 2 | 3 | 4 | 5 | 6 | 7 | 8 | Radiating Band Diameter |
|---|---|---|---|---|---|---|---|---|---|---|
| Sum | Circular Left | 0 | $\pi/4$ | $\pi/2$ | $3\pi/4$ | $\pi$ | $5\pi/4$ | $6\pi/4$ | $7\pi/4$ | $\lambda/\pi$ |
| Sum | Circular Right | 0 | $-\pi/4$ | $-\pi/2$ | $-3\pi/4$ | $-\pi$ | $-5\pi/4$ | $-6\pi/4$ | $-7\pi/4$ | $\lambda/\pi$ |
| 1st Diff | Circular Left | 0 | $\pi/2$ | $\pi$ | $3\pi/2$ | $3\pi/2$ | $\pi/2$ | $\pi$ | $3\pi/2$ | $2\lambda/\pi$ |
| 1st Diff | Circular Right | 0 | $-\pi/2$ | $-\pi$ | $-3\pi/2$ | $-3\pi/2$ | $-\pi/2$ | $-\pi$ | $-3\pi/2$ | $2\lambda/\pi$ |
| 1st Acq | Circular Left | 0 | $3\pi/4$ | $3\pi/2$ | $\pi/4$ | $\pi$ | $7\pi/4$ | $\pi/2$ | $5\pi/4$ | $3\lambda/\pi$ |
| 1st Acq | Circular Right | 0 | $-3\pi/4$ | $-3\pi/2$ | $-\pi/4$ | $-\pi$ | $-7\pi/4$ | $-\pi/2$ | $-5\pi/4$ | $3\lambda/\pi$ |

It is noted from Table III that the sum mode pattern for left circular polarization is derived by exciting the log-periodic array with voltages having precisely the same phase relationship as required for deriving the sum mode of the spiral array of FIGURE 12. It is also noted that the radiation band diameter for the left circular polarization sum mode is $\lambda/\pi$, the same as for the spiral array. The radiation band diameter is confined to $\lambda/\pi$ because of the interleaving effect of the unipole conductors 193–196 on the several log-periodic elements 181–188. If the conductors or radiators 193–196 were not interleaved, radiation from each log-periodic element would occur at a distance of $\lambda/\pi$ from the center of the radiator, rather than being confined to a radius of $\lambda/2\pi$. The mutual coupling, however, between the unipole radiators 193–196 of each log-periodic element causes cancellation of radiation at the greater distances from the center of the array, to simulate the spiral effect.

Another observation from Table III is that the sum mode for energy polarized in the right circular direction is derived merely by reversing the phase of the energy applied to log-periodic elements 181–188 from the phase relationship that caused the left circular polarization sum mode to be derived. An inspection of Table III for the difference and acquisition modes, $\Delta_1$ and $\Delta_2$, respectively, indicates that the same reversed phase relationship is utilized for deriving the left and right circular polarizations of each mode. It is also noted from Table III that the first difference mode, which is utilized for deriving azimuth and elevation error signals for the left circular polarization, has exactly the same phase excitation relationship as the phase excitation for deriving the $\Delta_1$ mode from the spiral. In addition, the radiating band diameters for the $\Delta_1$ modes are $2\lambda/\pi$ for both the log-periodic and spiral arrays. These similarities are to be expected since the interleaved log-periodic array of FIGURE 7 closely simulates the eight arm spiral of FIGURE 12. It is also noted from Table III that the first acquisition mode, $\Delta_2$, for left circular polarization is derived by exciting log-periodic elements 281–288 with the same phase relationship as excites the spiral array of FIGURE 12 for the $\Delta_2$ mode.

Excitation of the log-periodic array of FIGURE 17 in accordance with Table I results in patterns from the array having the same relative amplitudes as indicated by FIGURE 13 for the sum, first difference and first acquisition modes, $\Sigma$, $\Delta_1$, and $\Delta_2$, respectively. Because the sum, first difference and first acquisition mode amplitudes derived from the log-periodic array are like the corresponding amplitude patterns from the spiral array, the antenna system pattern, including the parasitic parabolic reflector, is the same as shown for the $\Sigma$, $\Delta_1$ and $\Delta_2$ patterns of FIGURE 15.

The phase relationships between the several modes derived from the log-periodic array are the same as for the circular array when considering the sum, first and second difference modes of left-hand circular polarization. For the circularly polarized modes in the right direction, however, the relative phase is negative at any angle about the boresight relative to the left hand circularly polarized modes. This fact should be evident since the left-hand circularly polarized wave is derived by sequentially activating log-periodic elements 81, 82, 83, etc., with the same phase, while the right circularly polarized modes are derived by successively energizing elements 81, 88, 87, etc.

To excite the log-periodic array of FIGURE 17 in accordance with the relative phase distribution indicated by Table III, a hybrid network having the same configuration as the hybrid for exciting the eight arm spiral, FIGURE 16, is utilized. When the hybrid network of FIGURE 16 is utilized to excite the log-periodic array of FIGURE 17, however, the $\Delta_3$ excitation port 114 is connected to a matching resistor through ground. The ports for exciting the spiral array to the $\Sigma$, $\Delta_1$ and $\Delta_2$ modes are utilized for exciting the log-periodic array to the same modes for left circular polarization. To excite the log-periodic array to the $\Sigma$, $\Delta_1$ and $\Delta_2$ modes for right circular polarization, ports 117, 116 and 115, respectively, are energized.

The antenna array of FIGURE 17 is utilized for tracking with oppositely polarized circular modes, by employing it in a system such as illustrated by FIGURE 19. Log-periodic array 280 is positioned with its center at the focal point of parabolic reflector 297. The input terminals 291 of parabolic elements 281–288 are respectively connected to ports 101–108 of hybrid network 298. Ports 111–113 of the hybrid network 298 are utilized for exciting the log-periodic array 280 to the left circular polarization modes, while ports 115–117 excite the array into the three right-hand circular polarization modes.

Ports 111 and 117 for respectively exciting the sum circular left and sum circular right modes are connected to TR boxes 301 and 302, respectively. TR boxes 301 and 302 are responsive to pulses of microwave energy derived from transmitters 303 and 304, respectively. In some instances, transmitters 303 and 304 are a single unit that simultaneously supplies pulses to TR boxes 301 and 302.

The six sum and difference mode signals are supplied to a different one of the mixers in mixer bank 305. All of the mixers in bank 305 are driven in parallel by the output of local oscillator 306, whereby six separate I.F. signals are derived indicative of the phase and amplitude of the energy derived from each of the modes. Each of the six I.F. signals is supplied to a separate one of the I.F. amplifiers in amplifier bank 307.

The amplified I.F. left-hand circular polarization sum mode is applied in parallel to phase detectors 308 and 309, while the left circular polarization $\Delta_1$ mode is applied to these detectors with a relative phase shift of 90°, introduced by phase shifter 311. Thereby, elevation and azimuth information relative to the boresight axis of the antenna system comprising reflector 297 and array 280 is derived for a target that responds to the left-hand circular polarization modes. An indication of a target that responds considerably to the left-hand circular polarization energy, but which is outside of the normal acquisition angle thereof, is derived by supplying the I.F. signal indicative of the circular left polarization $\Delta_2$ mode to phase detectors 312 and 312', the former also responding to the I.F. signal indicative of the left circular polarization $\Delta_2$ mode. Phase detector 312' is responsive to the left circular polarization $\Delta_2$ mode energy after the I.F. signal has been phase shifted 90° by phase changer 317. The outputs of phase detectors 312 and 312' thereby derive an indication of the angle about the boresight axis of where a target that responds to the left circular polarization energy is located. Both phase detectors, which derive positive and negative voltages, are needed to determine the quadrant where the target is positioned.

In a similar manner to that described for targets responding considerably to the left circular polarization modes, phase detectors 313 and 314, together with 90° phase shifter 315 derive elevation and azimuth information for targets that respond to the right-hand circular polarization modes. Phase shifter 315, however, is interconnected slightly different for the right-hand circular polarization modes because of the negative phase relationship indicated by FIGURE 18. In consequence, the right circular polarization sum mode signal is shifted in phase 90° prior to being fed to phase detector 314, from which the azimuth indication is derived, while the first difference mode signal for right-hand circular polarization is fed in parallel to detectors 313 and 314. To derive acquisition information from the right-hand circular polarization $\Delta_2$ mode, phase detectors 316 and 316' are connected to the outputs of the I.F. amplifiers responsive to the energy at ports 115 and 116, the latter phase detector being connected through phase shifter 318 to be responsive to the right circular polarization $\Delta_1$ mode I.F. signal.

While there has been described and illustrated several specific embodiments of the invention, it will be clear that variations in the details of the embodiment specifically illustrated and described may be made without departing from the true spirit and scope of the invention as defined in the appended claims. For example, the log-periodic array of FIGURE 17 can include a plurality of interleaved log-periodic elements equi-spaced about the center of the array. The array must include, however, at least five log-periodic elements to provide the proper response and output signals. A log-periodic array having N elements is fed by a hybrid network that is excited with signals at (N–2) or the even integer one greater than (N–2) ports. This relationship is seen from FIGURE 19 where $N=8$ and six input excitation ports 111, 112, 113, 115, 116 and 117 are provided. In an array of five log-periodic elements, for example, four input excitation ports are included.

I claim:

1. A monopulse tracking system comprising an antenna array deriving circularly polarized patterns, said array including at least four frequency independent radiators, means exciting said radiators to derive simultaneously sum and first difference mode patterns, said exciting means including separate ports for said sum and first difference modes, the first difference mode port deriving a signal having two orthogonal phase components, means for comparing one of the phase components of the signal deriving from the first difference mode port with the phase of the signal deriving from the sum mode port, and means for comparing the other phase component of the signal deriving from said first difference mode port with the phase of the signal deriving from the sum mode port.

2. The tracking system of claim 1 wherein said exciting means includes a microwave network of power dividers and phase shifters, said network being arranged so that excitation of said array with said sum mode causes a signal to be derived only from said sum mode port and excitation of said array with said difference mode causes a signal to be derived only from said difference mode port.

3. The tracking system of claim 1 wherein the radiators of said array are conducting elements extending outwardly from a common center about which said elements are equispaced.

4. The tracking system of claim 3 wherein said exciting means includes a microwave network of four hybrids and three 90° phase shifters, said hybrids and phase shifters being arranged so that excitation of said array with said sum mode causes a signal to be derived only from said sum mode port and excitation of said array with said difference mode causes a signal to be derived only from said difference mode port.

5. The tracking system of claim 3 wherein said elements are spirals.

6. The tracking system of claim 5 wherein four of said spirals are provided, the terminals of said spirals closest to the array boresight axis being located at the corners of a square.

7. The tracking system of claim 5 wherein eight of said spirals are provided.

8. The tracking system of claim 7 wherein said excitation means includes a microwave network having eight first ports and at least three second ports, each of said first ports being connected in energy exchange relationship with a different one of said radiator elements, said network being arranged so that simultaneously: two of said second ports derive said sum and first difference mode patterns, respectively, another one of said second ports derives a difference mode having the maximum amplitude of its pattern displaced farther from the array center than the first difference mode; and means for detecting the signal deriving from another second port.

9. The tracking system of claim 7 wherein said excitation means includes a microwave network having eight first ports and seven second ports, each of said first ports being connected in energy exchange relationship with a different one of said radiator elements, said network being arranged so that simultaneously: two of said second ports derive said said sum and first difference mode patterns, respectively, each of said other second ports derives a separate difference mode having the maximum amplitude of its pattern displaced by a different amount from the center of the array center and by a greater distance than the first difference mode; and means for detecting the signal deriving from each of said another second ports.

10. The tracking system of claim 9 wherein each of said another difference ports respectively derives a signal corresponding with the second, third, fourth, fifth and sixth difference mode patterns, and said detecting means includes means for separately phase comparing each of said difference mode pattern signals with the adjacently numbered difference mode pattern signal.

11. The tracking system of claim 5 wherein N of said spirals are provided, where N is greater than three.

12. The tracking system of claim 1 wherein said excitation means includes a microwave network having N first ports and between three and (N–1), inclusive second ports, each of said first ports being connected in energy exchange relationship with a different one of said radiator elements, said network being arranged so that simultaneously: two of said second ports derive said sum and first difference mode patterns, respectively, another one of said second ports derives a difference mode having the maximum amplitude of its pattern displaced farther from the array center than the first difference mode; and means for detecting the signal deriving from the another second port.

13. The tracking system of claim 11 wherein said excitation means includes a microwave network having N first ports and (N–1) second ports, each of said first ports being connected in energy exchange relationship with a different one of said radiator elements, said network being arranged so that simultaneously: two of said second ports derive said sum and first difference mode patterns, respectively, each of said other second ports derives a separate difference mode having the maximum amplitude of its pattern displaced by a different amount from the center of the array center and by a greater distance than the first difference mode; and means for detecting the signal deriving from each of said another second ports.

14. The tracking system of claim 13 wherein each of said another difference ports respectively derives a signal corresponding with the second, third, . . . (N–2) difference mode patterns, and said detecting means includes means for separately phase comparing each of said difference mode pattern signals with the adjacently numbered difference mode pattern signal.

15. The tracking system of claim 3 wherein said elements are log-periodic.

16. The tracking system of claim 15 wherein each of said radiators comprises: a conductor extending radially from the center of the array, a plurality of arcuate conductors spaced along said radial conductor and dimensioned in accordance with the log-periodic criterion, alternate ones of said arcuate conductors being connected on either side of said radially extending conductor, each of said arcuate conductors being a segment of a circle lying along a different circumference from the array center; the arcuate conductors of adjacent ones of said radiators being interleaved.

17. The tracking system of claim 15 wherein eight of said elements are provided.

18. The tracking system of claim 17 wherein said excitation means includes a microwave network having eight first ports and at least three second ports, each of said first ports being connected in energy exchange relationship with a different one of said radiator elements, said network being arranged so that simultaneously: two of said second ports derive said sum and first difference mode patterns, respectively, another one of said second ports derives a difference mode having the maximum amplitude of its pattern displaced farther from the array center than the first difference mode; and means for detecting the signal deriving from the another second port.

19. The tracking system of claim 17 wherein said excitation means includes a microwave network having eight first ports and six second ports, each of said first ports being connected in energy exchange relationship with a different one of said radiator elements, said network being arranged so that simultaneously: the first, second and third ones of said second ports respectively derive sum, first difference and second difference mode patterns for a first circular polarization direction while the fourth, fifth and sixth ones of said second ports respectively derive sum, first difference and second difference mode patterns for a second circular polarization direction, and detecting means for separately phase comparing the first and second difference mode pattern signals of each polarization direction.

20. The tracking system of claim 15 wherein N of said elements are provided, where N is greater than four.

21. The tracking system of claim 20 wherein said excitation means includes a microwave network having N first ports and any even integral number between four and (N–2), inclusive, of second ports, each of said first ports being connected in energy exchange relationship with a different one of said radiator elements, said network being arranged so that simultaneously: half of said second ports derive sum and difference mode patterns in one circular polarization direction and the other half of said second ports derive sum and difference mode patterns in another circular polarization direction; and means for detecting the signal deriving from each of said second ports.

22. The tracking system of claim 20 wherein said excitation means includes a microwave network having N first ports and (N–2) or the even integer one greater than (N–2) second ports, the number of second ports being equal to M, each of said first ports being connected in energy exchange relationship with a different one of said radiator elements, said network being arranged so that simultaneously: the $$1, 2 \ldots \frac{M}{2}$$

of said second ports respectively derive the sum, first difference $$\ldots \frac{M}{2}$$

difference mode patterns in one circular polarization direction while the $$\left(\frac{M}{2}+1\right), \left(\frac{M}{2}+2\right) \ldots M$$

of said second ports respectively derive the sum, first difference $$\ldots \frac{M}{2}$$

difference mode patterns in another circular polarization direction, and means for separately phase comparing the adjacently numbered difference mode pattern signals of each polarization direction.

23. A monopulse tracking system comprising an antenna array deriving circularly polarized patterns, means exciting said array to derive simultaneously sum, first difference and at least one other difference mode patterns, said exciting means including separate ports for each of said modes, the first difference mode port deriving a signal having two orthogonal phase components, means for comparing one of the phase components of the signal deriving from the first difference mode port with the phase of the signal deriving from the sum mode port, means for comparing the other phase component of the signal deriving from said first difference mode port with the phase of the signal deriving from the sum mode port, and means for detecting the signal deriving from the other difference mode pattern port.

24. The tracking system of claim 23 wherein said excitation means excites simultaneously all of said mode patterns in both circular polarization directions, means for phase comparing the first difference and sum mode signals of each polarization direction separately and means for separately detecting the other difference mode signals of each polarization direction.

25. The tracking system of claim 23 wherein said exciting means further excites simultaneously each of the difference mode patterns between the first and Nth, where N is greater than one, said exciting means including a separate port for each of said modes, and means for detecting the signal deriving from each of said ports.

26. The tracking system of claim 25 wherein said detecting means comprises means for phase comparing adjacent numbered ones of said difference mode pattern signals.

27. The tracking system of claim 25 wherein said excitation means excites simultaneously all of said mode patterns in both circular polarization directions, means for phase comparing the first difference and sum mode signals of each polarization direction separately, and means for separately detecting the other difference mode signals of each polarization direction.

28. The tracking system of claim 26 wherein said detecting means comprises means for phase comparing adjacent numbered ones of said difference mode pattern signals.

29. In a tracking system, a spiral radiator array comprising N coupled spiral radiator elements, where N is an integer greater than two, an excitation network having N first ports and at least two second ports, each of said N first ports being coupled in energy exchange relationship with a different one of said elements, said excitation network including means for coupling energy between said first and second ports for exciting the sum and first difference mode patterns of said array simultaneously.

30. The tracking system of claim 29 wherein $N=4$.

31. The tracking system of claim 29 wherein said excitation network includes: between three and (N–1) second ports, and means for coupling energy between said first and at least one of said second ports for exciting a second difference mode pattern of said array simultaneously with said sum and first difference mode patterns, said second difference mode having a radiating diameter greater than the radiating diameter of said first difference mode.

32. The tracking system of claim 29 wherein each of said radiator elements comprises: a conductor extending radially from the center of the array, a plurality of arcuate conductors spaced along said radial conductor and dimensioned in accordance with the log-periodic criterion, alternate ones of said arcuate conductors being connected on either side of said radially extending conductor, each of said arcuate conductors being a segment of a circle lying along a different circumference from the array center; the arcuate conductors of adjacent ones of said radiators being interleaved.

33. In a tracking system, a radiator array comprising N coupled, arcuate radiator elements equispaced about the array center of deriving circularly polarized patterns, where N is an integer greater than two, an excitation network having N first ports and at least two second ports, each of said N first ports being coupled in energy exchange relationship with a different one of said elements, said excitation network including means for coupling energy between said first and second ports for exciting the sum and first difference mode patterns of said array simultaneously.

34. The tracking system of claim 33 wherein said elements are log-periodic.

35. The tracking system of claim 34 wherein each of said radiators comprises: a conductor extending radially from the center of the array, a plurality of arcuate conductors spaced along said radial conductor and dimensioned in accordance with the log-periodic criterion, alternate ones of said arcuate conductors being connected on either side of said radially extending conductor, each of said arcuate conductors being a segment of a circle lying along a different circumference from the array center; the arcuate conductors of adjacent ones of said radiators being interleaved.

36. An antenna array comprising a plurality of coupled, identically shaped log-periodic radiators equispaced about the center of the array, each of said radiators including: a conductor extending radially from the center of the array, a plurality of arcuate conductors spaced along said radial conductor and dimensioned in accordance with the log-periodic criterion, alternate ones of said arcuate conductors being connected on either side of said radially extending conductor, each of said arcuate conductors being a segment of a circle lying along a different circumference from the array center; the arcuate conductors of adjacent ones of said radiators being interleaved.

References Cited

UNITED STATES PATENTS

| | | | |
|---|---|---|---|
| 3,144,648 | 8/1964 | Dollinger | 343—100 |
| 3,229,293 | 1/1966 | Little et al. | 343—895 X |
| 3,259,899 | 7/1966 | Cook | 343—113 |

OTHER REFERENCES

John D. Dyson: IEEE Transactions on Antennas and Propagation, The Characteristics and Design of the Conical Log-Spiral Antenna, July 1965, pp. 488–499 relied on.

RODNEY D. BENNETT, *Primary Examiner.*

J. P. MORRIS, *Assistant Examiner.*